United States Patent
Stewart et al.

(10) Patent No.: US 6,619,121 B1
(45) Date of Patent: Sep. 16, 2003

(54) PHASE INSENSITIVE QUADRATURE NULLING METHOD AND APPARATUS FOR CORIOLIS ANGULAR RATE SENSORS

(75) Inventors: Robert E. Stewart, Woodland Hills, CA (US); Stanley F. Wyse, Encino, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 5 days.

(21) Appl. No.: 09/915,026

(22) Filed: Jul. 25, 2001

(51) Int. Cl.⁷ .......................... G01C 19/56; G01P 15/08

(52) U.S. Cl. ................................ 73/504.02; 73/504.12

(58) Field of Search .................. 73/504.02, 504.04, 73/504.12, 504.14, 514.32, 514.29, 514.16, 514.17, 514.18, 514.24, 1.37, 1.38, 1.39, 1.75, 1.77

(56) References Cited

U.S. PATENT DOCUMENTS

| | | | |
|---|---|---|---|
| 4,336,718 A | 6/1982 | Washburn | |
| 4,483,194 A | 11/1984 | Rudolf | |
| 4,510,802 A | 4/1985 | Peters | |
| 4,512,192 A | 4/1985 | Peters | |
| 4,553,436 A | 11/1985 | Hansson | |
| 4,583,404 A | 4/1986 | Bernard et al. | |
| 4,584,885 A | 4/1986 | Cadwell | |
| 4,592,233 A | 6/1986 | Peters | |
| 4,660,418 A | 4/1987 | Greenwood et al. | |
| 4,679,434 A | 7/1987 | Stewart | |
| 4,699,006 A | 10/1987 | Boxenhorn | |
| 4,744,248 A | 5/1988 | Stewart | |
| 4,750,364 A | 6/1988 | Kawamura et al. | |
| 4,766,768 A | 8/1988 | Norling et al. | |
| 4,795,258 A | 1/1989 | Martin | |
| 4,841,773 A | 6/1989 | Stewart | |
| 4,945,765 A | 8/1990 | Roszhart | |
| 4,996,877 A | 3/1991 | Stewart et al. | |
| 5,006,487 A | 4/1991 | Stokes | |
| 5,007,289 A | 4/1991 | Stewart et al. | |
| 5,008,774 A | 4/1991 | Bullis et al. | |
| 5,016,072 A | 5/1991 | Greiff | |
| 5,025,346 A | 6/1991 | Tang et al. | |

(List continued on next page.)

FOREIGN PATENT DOCUMENTS

DE     199 39 3998     3/2001

OTHER PUBLICATIONS

Clark, William W.; Howe, Roger T.; and Horowitz, Roberto, Surface Micromachined Z–Axis Vibratory Rate Gyroscope, pp. 283–287, Solid–State Sensor and Actuator Workshop, Hilton Head, South Carolina, Jun. 2–6, 1996.

Clark, William A. et al., *Surface Micromachined Z–Axis Vibratory Rate Gyroscope*, Technical Digest, IEEE Solid–State Sensor and Actuator Workshop, New York, NY, Mar. 6, 1996, pp. 283–287, XP–001028168.

*Primary Examiner*—Helen Kwok

(57) ABSTRACT

Quadrature error occurs in Corolis based vibrating rate sensors because of manufacturing flaws that permit the sensing element to oscillate either linearly along or angularly about an axis that is not orthogonal to the output axis. This creates an oscillation along or about the output axis that is a component of the sensing element's vibration acceleration. This output axis oscillation is in phase with the driven acceleration of the sensing element and is called quadrature error since it is ninety degrees out of phase with the angular rate induced Coriolis acceleration. Rather than applying forces that reorient the axis of the driven vibration to be orthogonal to the output axis to eliminate the output axis oscillation, the present invention applies sinusoidal forces to the sensing element by means of a quadrature servo to cancel the output oscillation. In order to avoid the phase uncertainty associated with electronic modulation, the quadrature servo feeds back a DC signal that is modulated mechanically by means of an interdigitated variable area electrostatic forcer.

39 Claims, 7 Drawing Sheets

U.S. PATENT DOCUMENTS

| | | |
|---|---|---|
| 5,065,627 A | 11/1991 | Stewart et al. |
| 5,205,171 A | 4/1993 | O'Brien et al. |
| 5,241,861 A | 9/1993 | Hulsing, II |
| 5,277,053 A * | 1/1994 | McLane et al. .......... 73/514.17 |
| 5,392,650 A | 2/1995 | O'Brien et al. |
| 5,481,914 A * | 1/1996 | Ward ........................ 73/504.16 |
| 5,932,803 A | 8/1999 | Wyse |
| 5,987,986 A | 11/1999 | Wyse et al. |
| 5,992,233 A * | 11/1999 | Clark ........................ 73/514.35 |
| 6,122,961 A * | 9/2000 | Geen et al. .............. 73/504.12 |

* cited by examiner

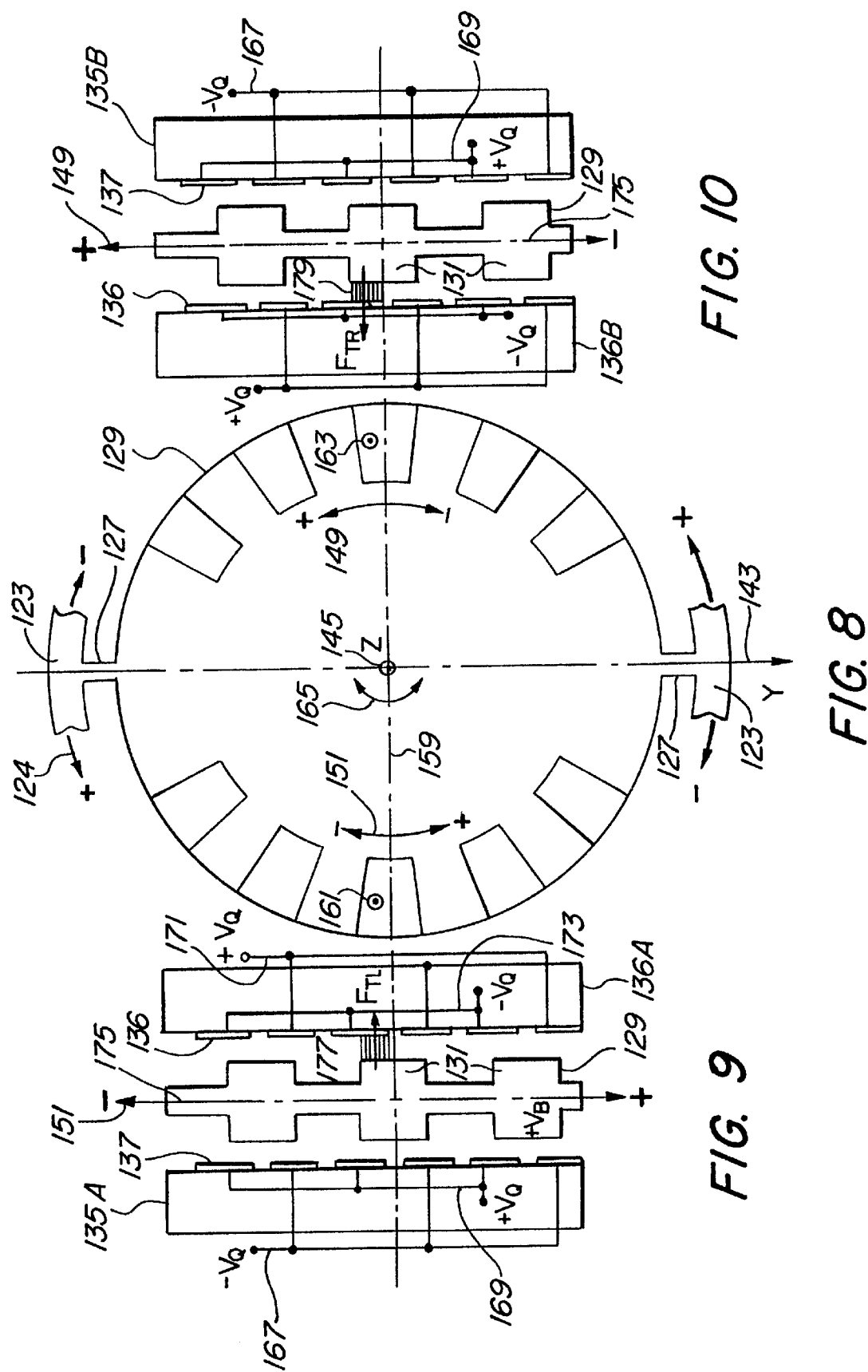

PHASE INSENSITIVE QUADRATURE NULLING METHOD AND APPARATUS FOR CORIOLIS ANGULAR RATE SENSORS

BACKGROUND OF THE INVENTION

1. Field of the Invention

The present invention relates to an inertial instrument and more specifically pertains to vibrating accelerometers used as multi-sensors for measuring linear acceleration and rate of rotation of a moving body.

2. Description of Prior Art

Gyroscopes are well known for use as angular velocity and acceleration sensors for sensing angular velocity and acceleration which information is necessary for determining location, direction, position and velocity of a moving vehicle.

SUMMARY OF THE INVENTION

The present invention utilizes two masses in tandem, a dither mass and a proof mass, or pendulum. Each mass has only a single degree of freedom. It is desired to have the dither mass move along an axis that is parallel to the plane of the housing. The driving forces on the dither mass causing its vibration do not act directly on the pendulum. These forces, however cause the dither mass to move out of the plane of the housing due to dither beam misalignments. This out-of-plane motion generates error signals which are in quadrature with the signals generated by rate inputs. Therefore, a high degree of phase discrimination is required to separate the rate signal from the quadrature signal. This invention uses a new quadrature nulling technique which eliminates the requirement for accurate phase and relaxes control of the dither beam alignment tolerances which generate out of plane motion. The present invention applies vibration driving signals to the dither mass to vibrate the dither mass and the proof mass at a combined resonant frequency, and applies a restoring force to the proof mass which is in phase with its dithered displacement. In an alternate embodiment, vibration driving signals are applied to the dither mass to vibrate the dither mass and proof mass which are in an X-Y plane at a combined resonant frequency about the Z axis of the X-Y plane. A restoring torque is applied to the proof mass which is in phase with its dithered displacement.

BRIEF DESCRIPTION OF THE DRAWINGS

The exact nature of this invention as well as its objects and advantages will become readily apparent from consideration of the following specification in relation to the accompanying drawings in which like reference numerals designate like parts throughout the figures thereof and wherein:

FIG. 8 is a top plan view of the disc-shaped proof mass with multiple teeth formed by etching grooves around its circumference;

FIG. 9 is a left side plan view showing the edge of the disc-shaped proof mass between its top and bottom covers, each cover containing quadrature nulling electrodes; and FIG. 10 is a right side plan view showing the edge of the disc-shaped proof mass between its top and bottom covers, each cover containing quadrature nulling electrodes.

DESCRIPTION OF THE PREFERRED EMBODIMENT

The accelerometer gyro disclosed in an application for Micromachined Silicon Gyro Using Tuned-Accelerometer having U.S. patent application Ser. No. 09/778,434 filed on Feb. 7, 2001 and assigned to the same assignee as the present application illustrates a micromachined accelerometer-gyro having a pendulous mass or proof mass suspended within a dither mass that provides improved performance as the result of a considerable decrease in manufacturing flaws that affects performance of the accelerometer gyro.

Figure 4:
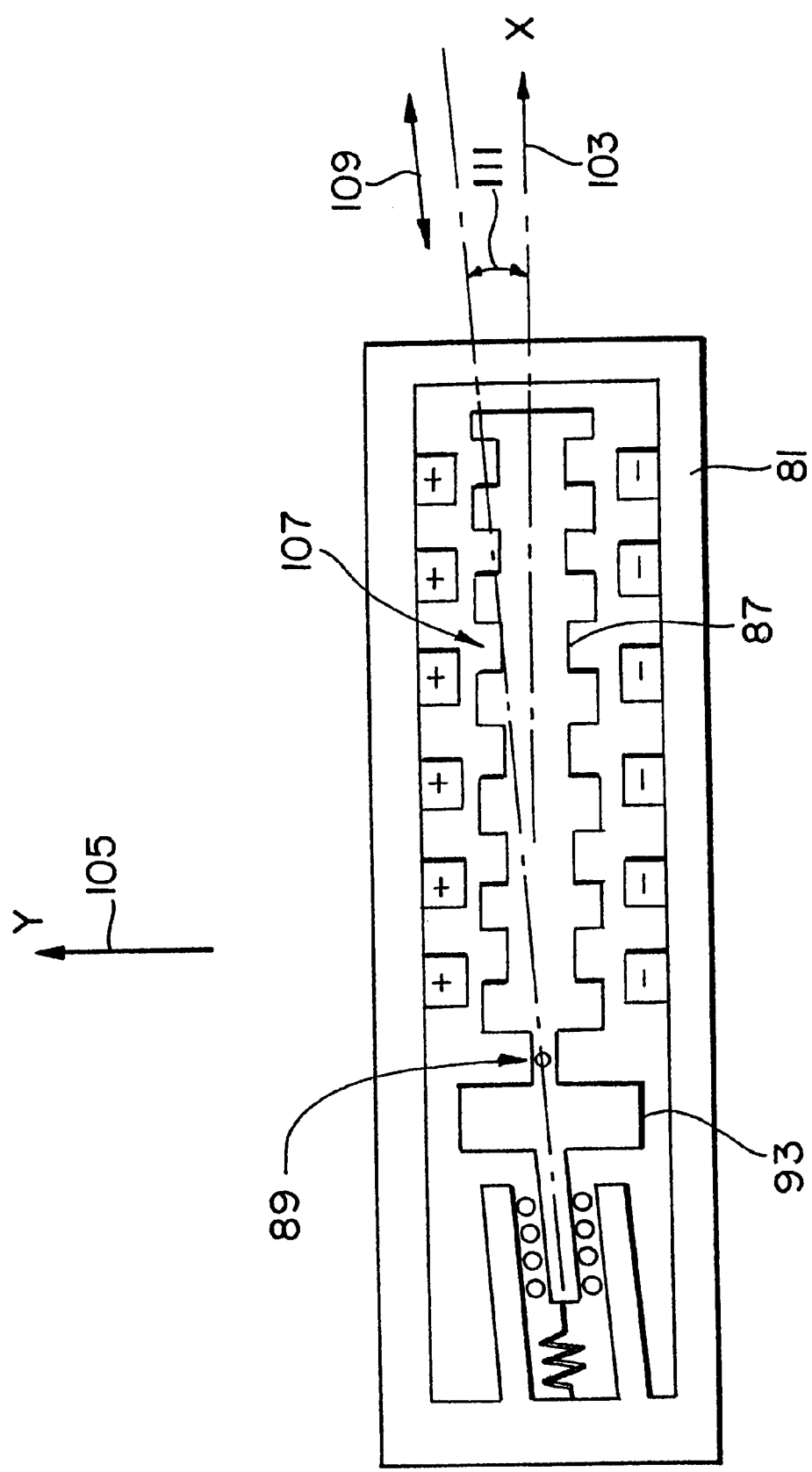
FIG. 4 is a diagrammatic illustration of the pendulum and dither mass or vibrating structure of the present invention.

The present invention goes beyond structural improvement of the proof mass and dither base assembly and the manufacture thereof by providing a means for nulling the error created from manufacturing tolerances and electronic phase uncertainty. Referring to FIG. 4, a conceptual schematic of the structure of the pendulum or proof mass 87 in association with the dither mass 93 is shown. The proof mass 87 is attached to the dither mass 93 by pendulum flexures points 89. As illustrated, the dither mass 93 moves back and forth in the direction 109. Because of the manufacturing flaws, the dither mass motion 109 is not exactly along the X axis 103 of the pendulum 87. The actual dither mass motion 109 is off-axis by a dither misalignment angle 111, causing slight oscillation in the Y direction 105.

If this displacement along the Y axis is differentiated twice, this acceleration is known as quadrature error. Quadrature error and Coriolis acceleration are very similar in that both are sinusoidal signals centered at the frequency of oscillation. However, quadrature error can be distinguished from Coriolis acceleration by the phase relative to the driven oscillation.

A prior art approach to solving the problem presented by quadrature error is discussed in an article entitled *Surface Micromachined Z-Axis Vibrating Rate Gyroscope* authored by William A. Clark, Roger T. Howe, and Roberto Horwitz and published as a paper in Solid State Sensor And Actuator Workshop held in Hilton Head, S.C., Jun. 2–6, 1996. The approach suggested in the paper to null quadrature error is to apply a balancing force that is exactly proportional to position of the proof mass. The paper suggests that this can be achieved by using interdigitated position sensing fingers that sense position of the proof mass. As this proof mass oscillates, the position sensing fingers, which are position sense capacitors, change proportionately. A slight modification in the d.c. bias voltage applied to these fingers results in a net force applied to the proof mass that is directly proportional to the position of the proof mass thereby forcing the proof mass to vibrate along the desired dither axis, in other words, parallel to the X axis which is the housing axis for the proof mass.

FIG. 4 illustrates in schematic form the structure of the dither mass or vibrating structure and the proof mass or pendulum structure of the present invention. In normal operation, the dither mass 93 which is the vibrating structure for the pendulum 87 oscillates off-axis by an angle 111 along direction 109. This off-axis vibration of the dither mass 93 is inherent in the construction of the rate sensor of the present invention. This is the best that can be done in the manufacturing process. This means that the dither mass and pendulum will naturally dither in the direction which is primarily along the X axis 103 but will also dither along Y axis 105 because of a misalignment angle 111 caused by mechanical imperfections of the dither driving beams during the etching phase of the fabrication.

As will be noted, the pendulum 87 is attached to the dither base 93 by the pendulum flexures 89. In operation, the pendulum 87 senses Coriolis acceleration causing the pendulum to rotate about the flexure 89. The present invention, in contrast to the approach in the above noted article, rather than forcing the dither base 93 and pendulum 87 to vibrate along the desired dither or X axis 103, which is parallel to the housing axis, allows the dither base 93 to vibrate along the misaligned direction 109. The quadrature control electrodes 107 of the present invention do not force the dither base 93 to vibrate along the X axis 103. The quadrature control electrodes 107 only exert forces on the pendulum mass 87 to cause pendulum motion about the flexure axis 89 so that the pendulum continuously centers within the housing 81 as sensed by the pickoff. In this manner, neither the dither base 93 nor the pendulum mass 87 are coerced to move along a certain axis, like X axis 103.

Figure 1:
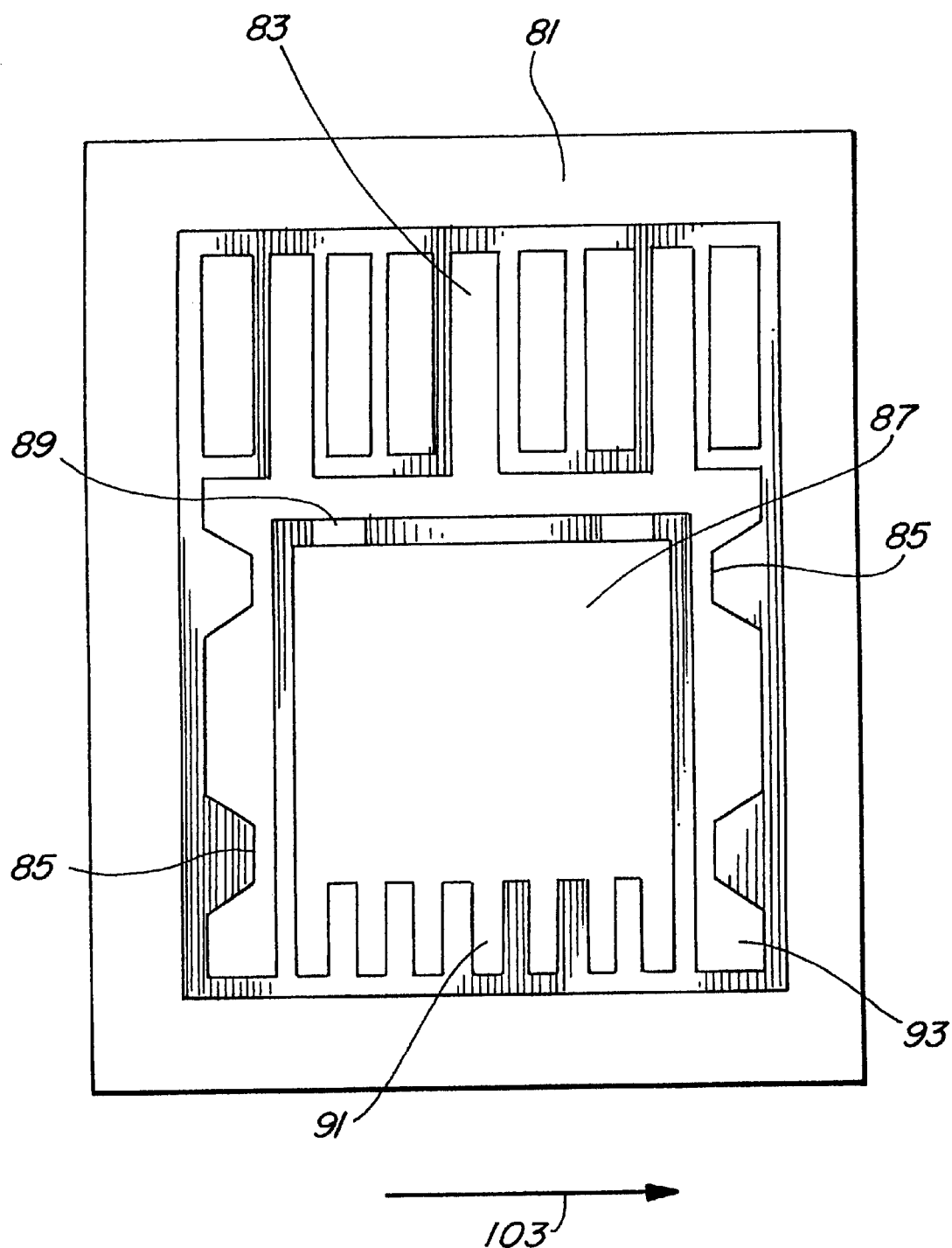
FIG. 1 is a top plane view of the driven and sensing element of an accelerometer according to the present invention.

As shown in FIG. 1, the angular rate sensor according to the present invention is constructed to have a pendulum or sensing element 87 which is attached by flexures 89 to the dither mass or vibrating structure 93 which has dither drive and pickoff electrodes elements 83 mounted thereon. The dither mass 93 is mounted for motion within the plane of the paper of FIG. 1 within a frame 81. The dither mass 93 has a plurality of flexure suspensions 85 therein to permit the dither motion along the X axis 103.

The mechanical misalignment illustrated graphically in FIG. 4, along with phase error of the dither reference signal are the major source of bias instability, nonrepeatability and temperature sensitivity of tuned Coriolis angular rate sensors. The present invention provides a method to servo the quadrature error signal to null. Since the servo signal is d.c., there is no resulting phase sensitivity. The result is improved bias stability, repeatability and reduced temperature sensitivity, in addition to relaxing the tolerance requirements on etching the dither beams and the tolerance requirements on the system digital electronics phase stability. The present invention is contrary to the traditional manner of controlling bias error. The traditional approach was to attempt exceptionally close tolerances on the etching of the dither beams and attempt to achieve exceptionally close system tolerances on the digital electronics phase stability circuitry.

The concept of the invention is to introduce a torque to the sensing element or pendulum 87 by the application of d.c. signals which results in an a.c. restoring force that is in phase with the dither displacement. Such a torque or forcer can be used to servo the quadrature error signal to null because the quadrature signal is in phase with acceleration which in turn is in phase with the dither displacement.

Figure 2:
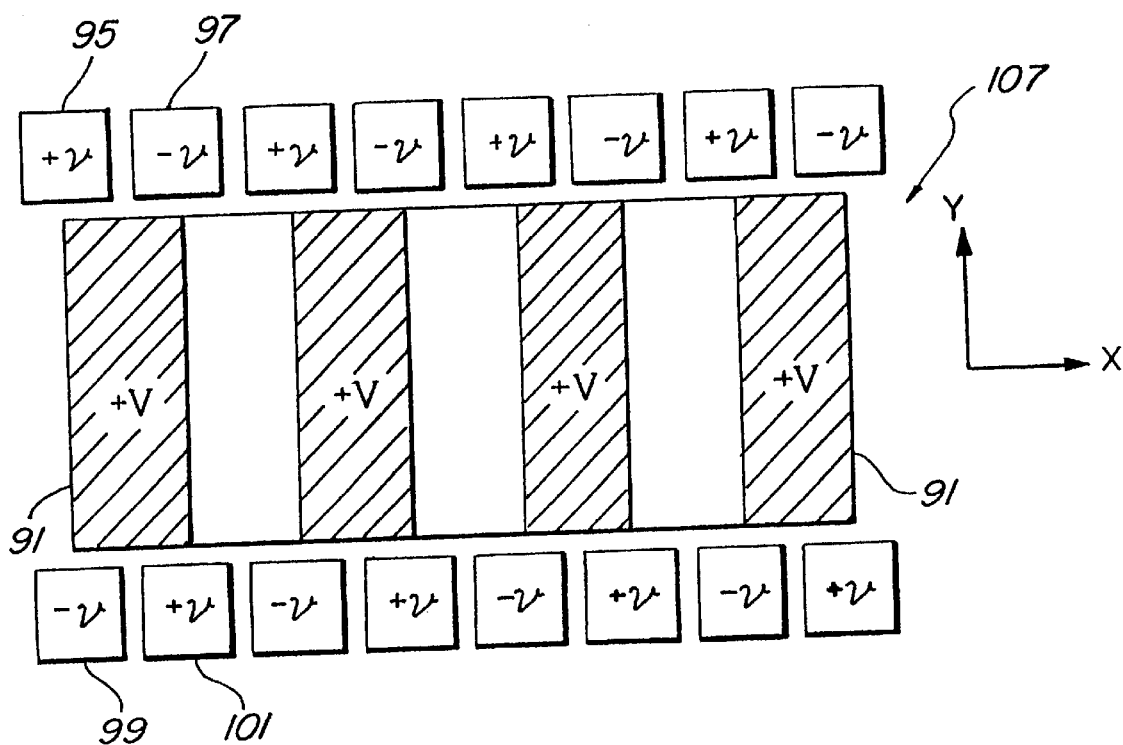
FIG. 2 is a cross-section of the quadrature nulling projection on the end of the pendulum of FIG. 4.

FIG. 2 is a diagram of a quadrature nulling forcer as envisioned by the present invention. FIG. 2 is a cross-section of the present invention taken through the region containing the top electrodes 95, 97, and bottom electrodes 99, 101 and the scalloped edge 91 of the sensing element 87.

The top electrodes 95, 97 and bottom electrodes 91, 101 are divided into segments having alternate polarities. Each electrode segment 95, 97 on the top, and aid 91, 101 on the bottom, are aligned with respect to the scalloped edge 91 of the sensing element so that both polarities of the alternate segments have equal areas overlapping each projection along the scalloped edge 91 of the sensing element 87 when the dither motion is not excited.

Figure 3:
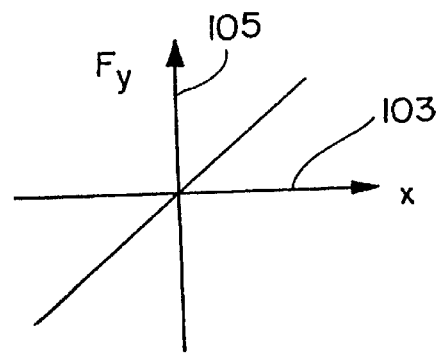
FIG. 3 is a diagrammatic illustration of the functional relationship of portions of the accelerometer of FIG. 1 and FIG. 4.

In operation, the quadrature nulling forcer exerts a force as depicted in the graph of FIG. 3. Assuming that the quadrature acceleration is in phase with displacement of the sensing element (pendulum 87), a bias voltage +V is applied to the sensing element and plus or minus d.c. control voltages v are applied to the top electrodes 95 and 97 and the bottom electrodes 99 and 101. As the sensing element 87 translates to the right from the position shown in FIG. 2, it will experience an upward force proportional to its displacement, and the control voltage v on the top and bottom electrodes. Conversely, as the sensing element and its scalloped edge projections 91 translate to the left from the position shown in FIG. 2, it will experience a downward force. The peak force will be experienced at the peak displacement and will be in phase with the peak quadrature force.

In operation, a closed loop servo system (not shown), of a type well known in the art is utilized to adjust the control voltages v on the upper electrodes and lower electrodes to null the quadrature portion of the sensing element pickoff. Because this control voltage is d.c., there is no phase instability. Referring to FIG. 4, this means that the quadrature control 107, which is adjusted to null the quadrature portion of the sensing element cause the pendulum to move about its flexure axis 89 to be continuously centered within the housing 81. In this manner, neither the dither mass 93 nor the pendulum sensing mass 87 are coerced to move parallel to the housing axis 103 while still nulling quadrature error. This allows the dither mass 93 to move along its misaligned path 109 relative to the housing generating motion along the Y output axis 105 but still have the resulting quadrature error nulled. This approach to quadrature error nulling is generally applicable to rate sensors having a certain structure.

This quadrature error nulling method is possible because the two masses in operation in the present rate sensor structure are in tandem, with each mass having only a single degree of freedom. In other words, the dither mass 93 is attached to the pendulous mass 87 by the flexure 89. As a result, the dither forces act only on the dither mass and not on the pendulous mass 87.

An alternate preferred embodiment of the present invention is shown in FIGS. 5–10. These figures illustrate a rotationally dithered proof mass which is disc-shaped. This disc-shaped proof mass is mounted within a ring-like dither mass which is suspended within a frame for rotational dither motion. The dither mass dithers about its Z axis which is perpendicular to the X-Y plane within which the ring shaped dither mass is located. A proof mass is mounted within the ring-shaped dither mass in the X-Y plane and rotates about an output axis Y for an input rate about the X axis. In other words, the proof mass oscillates about the Y torsion bar axis for an input rate on the X axis.

Figure 5:
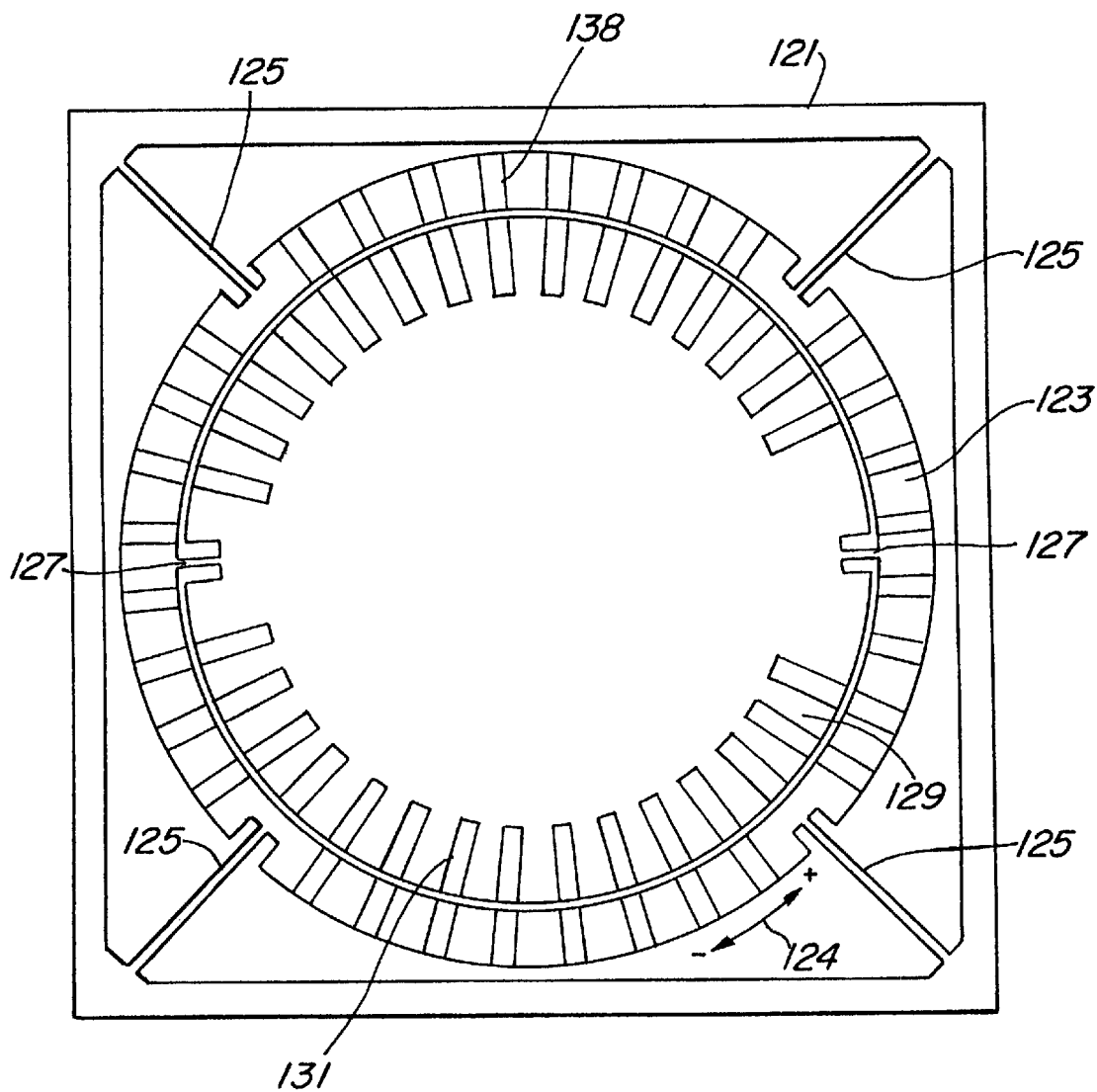
FIG. 5 is a top plan view of an alternate configuration for the proof mass and dither mass of the present invention.
Figure 6:
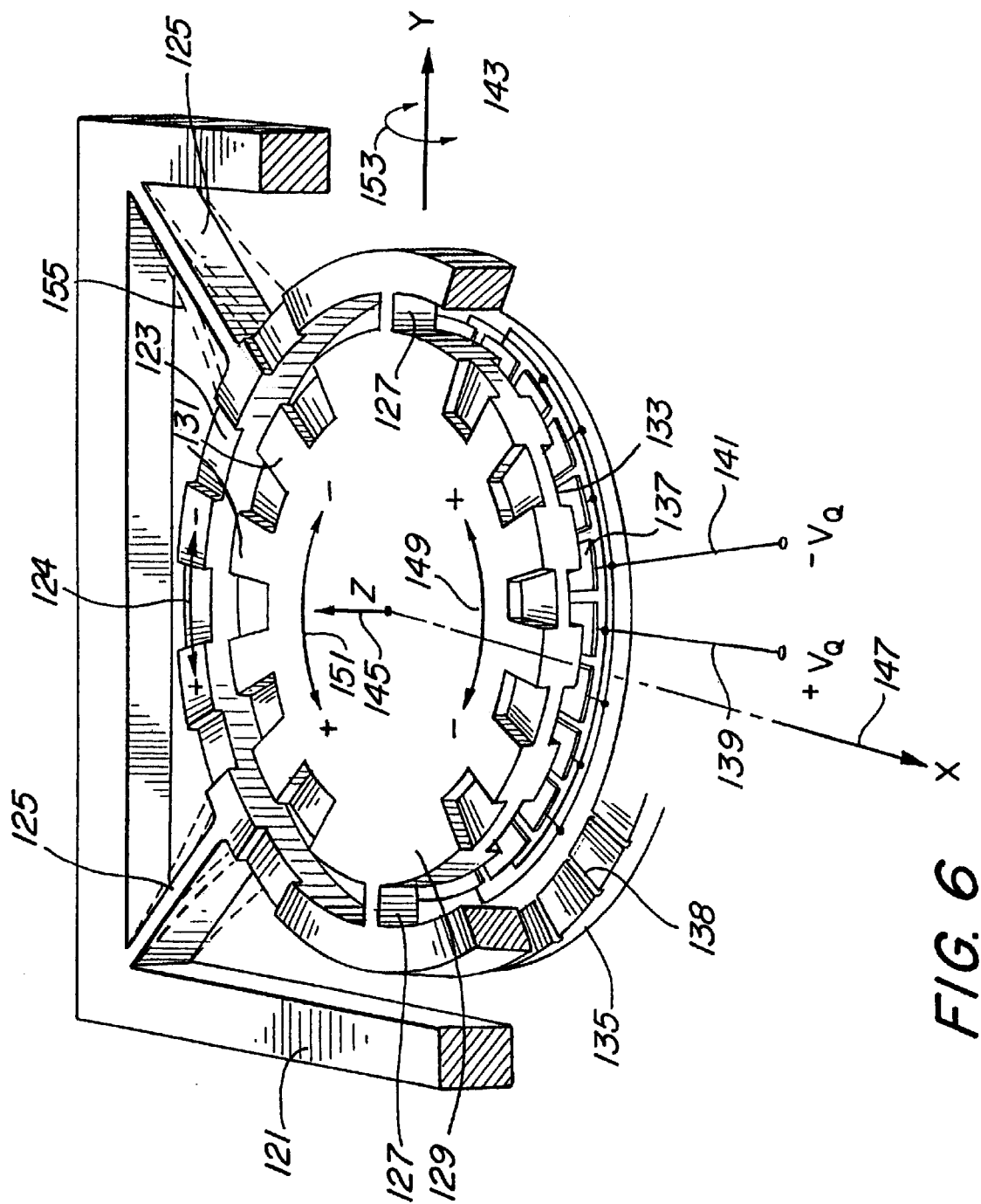
FIG. 6 is a partial broken-away perspective of the configuration of FIG. 5 showing the relationship between the disc-shaped proof mass and the ring-shaped dither mass.

Referring first to FIG. 5 and 6, which shows the general relationship between the disc-like proof mass 129 mounted within the ring-like dither mass 123 by a pair of torsion bar suspensions 127, which lie along the Y axis of the proof mass 129 and dither mass 123. The dither mass 123 is suspended by a plurality of dither drive beams 125 which, in this preferred embodiment, are four in number, to a frame 121.

The ring-like dither mass 123 is driven rotationally about a Z axis which is perpendicular to the X-Y plane, which is the plane of the paper, in a positive and negative direction 124 causing the proof mass 129 to also be rotationally dithered. The proof mass contains a plurality of teeth 131 around its circumference, creating a scalloped edge, the purpose of which will be explained hereinafter. A plurality of electrodes 135 located in the cover for the dither mass 123 forces the dither mass to rotationally dither about the Z axis.

FIG. 6 is a three-dimensional partially broken away perspective showing the relationship of the proof mass 129 suspended within the ring-like dither mass 123. The dither mass 123 is suspended by a plurality of dither drive beams 125 which is the only attachment to a frame 121. The proof mass 129, in turn, is attached to the internal circumference of the ring-like dither mass 123 by a pair of torsion bars 127, which lie along a Y axis 143 of the X-Y plane 147, 143 within which the proof mass 129 and dither mass 123 lie.

Shown partially broken away is the bottom cover 135 which contains electrodes 138 therein for driving the dither mass in a back and forth dither motion 124 about the Z axis 145. This rotational dither motion about the Z axis 145 also dithers the proof mass in the directions 149, 151.

Also located in the bottom cover 135 are a plurality of quadrature nulling electrodes 137 which interact with the bottom teeth-like grooves 133 located about the circumference of the disc-like proof mass 129. Teeth 131 are also located on the top surface of proof mass 129 around its circumference.

The quadrature nulling electrodes 137 located in a semicircle in the cover are located with respect to the bottom teeth-like grooves 133 on the proof mass 129. The electrodes 137 are preferably deposited titanium and gold electrodes on glass, like pyrex glass, for example. The top and bottom covers for the accelerometer-gyro are preferably made of pyrex glass. A positive d.c. voltage is supplied to half of the electrodes along the perimeter of the proof mass disc on line 139. A negative d.c. voltage is supplied to the remaining electrodes on line 141. These d.c. voltages effectuate quadrature nulling in a manner which will be more fully explained hereinafter.

In operation, while the ring-like dither mass 123 is rotationally dithered about the Z axis causing the proof mass 129 to also be dithered about the Z axis, an input rate along the X axis 147 will cause the proof mass 129 to oscillate about the Y torsion axis 143 in an oscillatory motion 153 about the Y torsion axis 143.

Figure 7:
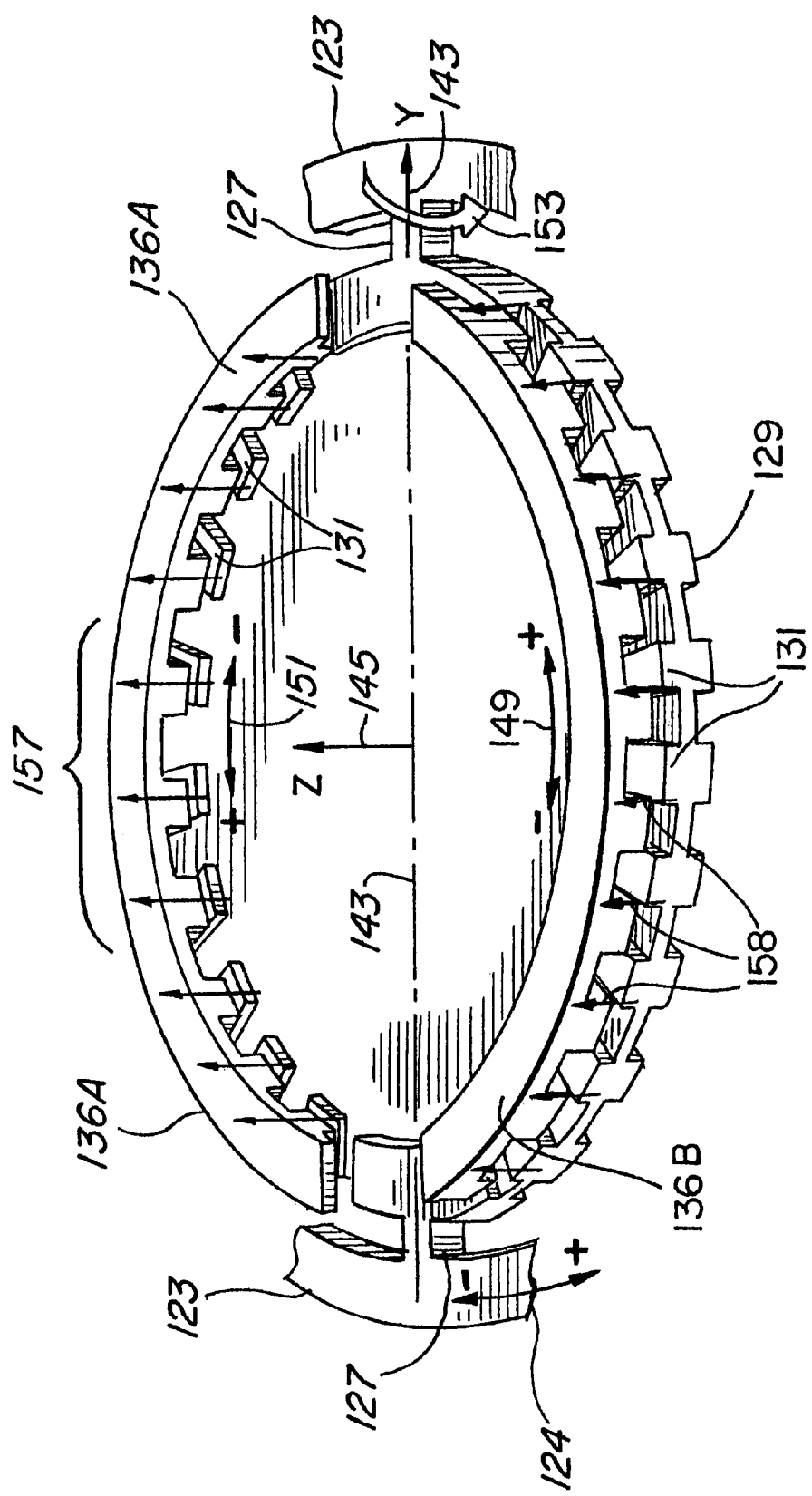
FIG. 7 is a partial perspective showing the relationship between the proof mass of FIG. 5 with its top cover and the quadrature nulling electrodes.

Because of manufacturing tolerances, the Z dither axis 145 may not be exactly perpendicular to the Y torsion axis 143, causing unwanted oscillation to act about the Y torsion axis 143 as a result of this misalignment. As shown in FIG. 7, the dither mass 123 is being driven in a rotational dither direction 124 about Z axis 145, causing the proof mass 129 to be likewise dithered in the direction 149 on its right side, and the direction 151 on its left side. The top cover 136 for the accelerometer-gyro is illustrated as being fabricated from silicon with protruding teeth thereon that interact with the teeth 131 along the circumference of the disc-like proof mass 129. The displacement of the teeth in the right side top cover 136B, with respect to the teeth 131 and the displacement of the teeth in the left side top cover 136A, with respect to the teeth 131 in the proof mass 129 are illustrated for the case of a peak positive dither amplitude. In this situation, the forces 157 parallel to the Z axis on the left side top cover of the proof mass 129 are strong because the teeth are aligned, while the forces 158 on the right side top cover of the proof mass 129 are weak because the teeth are staggered. This differential creates a torque 153 about Y torsion bar axis 143. Since the Y torsion bar axis 143 is the output axis for the accelerometer-gyro, this torque cancels the effect due to the unwanted oscillation from the misalignment of the Z dither axis 195.

FIGS. 8, 9, and 10, illustrate the relationship between the proof mass 129 and its teeth 131 around its perimeter with the electrodes 136 located on the top cover 136A and 136B and the electrodes 137 located on the bottom cover 135A and 135B.

FIGS. 8, 9, and 10, illustrate the relationship between the proof mass 129 and the top and bottom covers and their respective electrodes when the dither motion 124 is at zero amplitude as a starting point. In other words, the dither mass 123 is at null about the Z axis 145.

As the dither mass moves from this null position in a positive direction causing the proof mass 129 to also move in a positive direction 149, the capacitance 179 between electrodes 136 and the teeth 131 of the proof mass 129 gets bigger because the teeth are becoming more aligned with the electrodes. At the same time, the capacitance 177 between electrodes 136 and the teeth 131 of the proof mass 129 on the left side become smaller. This causes the upward force $F_{TR}$ on the right side acting on the paddle to increase, while the upward force $F_{TL}$ on the left side becomes quite low. This difference in upward force between the left and right side of the proof mass 129 causes a torque to be developed about the torsion Y axis 143 which, in turn, causes the proof mass 129 to rotate about the torsion Y axis 143.

When the dither mass goes into a negative direction causing proof mass 129 to also go in a negative direction 151, the capacitance 179 on the right side gets smaller, while the capacitance 177 on the left side gets larger. This causes the upward force $F_{TL}$ on the left side to become large and the upward force $F_{TR}$ on the right side to become low, thereby reversing the torque on the Y axis 143 of the proof mass, which causes the proof mass 129 to move in the opposite direction about the Y torsion bar axis 143. In essence then, a sinusoidal torque acts on the proof mass 129 causing it to oscillate about the Y torsion bar axis 143 exactly in phase with the dither amplitude. That is, peak torque on the proof mass 129 occurs exactly when there is peak displacement for the dither motion 124 about Z axis 145.

These oscillating forces, $F_{TR}$ and $F_{TL}$, acting on the proof mass 129 can be servoed by automatically controlling the voltages $V_Q$ on lines 167 and 169 on the bottom cover, and lines 171 and 173 on the top cover, to thereby cancel the torque about Y axis 143, which is due to misalignment of the Z dither axis 145.

The cancellation of the torque generated about the torsion bar Y axis 143, as a result of the Z dither axis 145 not being perpendicular to the Y axis 143, results in considerably improved performance.

What is claimed is:

1. A method for nulling quadrature in an angular rate sensor, having a proof mass connected by a flexure to a dither mass, the dither mass mounted for vibration along a drive axis, the steps of the method comprising:

applying driving forces to the dither mass causing vibration of the dither mass along the drive axis and vibration of the proof mass along a dithered axis; and applying a restoring force to the proof mass in phase with the displacement along the dithered axis, the restoring force nulling the quadrature by aligning the proof mass dithered axis without changing the path of vibration of the dither mass along the drive axis.

2. The method of claim 1 wherein the restoring force is generated by applying appropriate level d.c. signals to electrodes adjacent to the proof mass.

3. The method of claim 1 wherein the applying a restoring force step comprises:
applying a bias voltage to the proof mass;
applying a plus or minus d.c. control voltage to spaced electrodes adjacent to the proof mass; and
adjusting the d.c. control voltages on the spaced electrodes to null the quadrature.

4. The method of claim 3 wherein the plus or minus d.c. control voltages are applied to spaced electrodes located at the top side and bottom side of the proof mass at fixed locations.

5. The method of claim 1 wherein said proof mass has a scalloped edge opposite to the flexure connection to the drive mass.

6. The method of claim 5 wherein the restoring force is generated by applying appropriate level d.c. signals to electrodes adjacent the scalloped edge of the proof mass.

7. The method of claim 5 wherein the applying a restoring force step comprises:
applying a bias voltage to the proof mass;
applying a plus or minus d.c. control voltage to spaced electrodes adjacent to the scalloped edge of the proof mass; and
adjusting the d.c. control voltages on the spaced electrodes to null the quadrature.

8. The method of claim 7 wherein the plus or minus d.c. control voltages are applied to electrodes which are spaced to overlap one half of a scallop on the scalloped edge of the proof mass when the proof mass is at rest.

9. The method of claim 7 wherein the plus or minus d.c. control voltages are applied to electrodes which are spaced to be adjacent to each scallop on the proof mass.

10. The method of claim 9 wherein the plus or minus d.c. control voltages are applied to spaced electrodes located at the top and bottom sides of the proof mass adjacent to each scallop on the proof mass.

11. An apparatus for nulling the quadrature in an angular rate sensor, the apparatus comprising:
a dither mass suspended for vibration along a drive axis;
a proof mass having a first and second end, the first end being connected to the dither mass by a flexure, the second end having a scalloped edge;
a source of driving forces to cause vibration of the dither mass along the drive axis;
a source of bias voltage applied to the proof mass;
electrodes located adjacent to the scalloped edge of the proof mass; and
a source of d.c. control voltages applied to the electrode, to null the quadrature.

12. The apparatus of claim 11 wherein the d.c. control voltage source comprises plus and minus d.c. voltages.

13. The apparatus of claim 11 wherein the d.c. control voltages are applied to electrodes which overlap one half of a scallop on the scalloped edge of the proof mass when the proof mass is at rest.

14. The apparatus of claim 12 wherein the plus and minus d.c. voltages are applied to electrodes spaced to be adjacent to a scallop on the proof mass.

15. The apparatus of claim 13 wherein the d.c. control voltages are applied to electrodes at the top and bottom sides of the proof mass adjacent to each scallop of the proof mass.

16. An apparatus for nulling the quadrature in a coriolis angular rate sensor, comprising:
a dither mass mounted within a frame for vibration along a drive axis;
a proof mass connected to said dither mass by a flexure for oscillating at a predetermined frequency along a dithered axis;
a source of driving forces applied to the dither mass;
a source of bias voltage applied to the proof mass; and
a source of d.c. control voltages applied to electrodes adjacent to the proof mass for providing a restoring force to the oscillating proof mass which is in phase with its displacement to align the proof mass dithered axis without changing the path of vibration of the dither mass along the drive axis.

17. The apparatus of claim 16 wherein the source of d.c. control voltages comprise plus and minus d.c. voltages.

18. The apparatus of claim 16 wherein the proof mass has a scalloped edge at an end opposite to the flexure connection to the dither base.

19. The apparatus of claim 18 wherein the plus and minus d.c. voltages are applied to electrodes which overlap one half of a scallop on the scalloped edge of the proof mass.

20. The apparatus of claim 18 wherein the plus and minus d.c. voltages are applied to electrodes adjacent to each scallop on the proof mass.

21. A method for nulling quadrature in an angular rate sensor having a dither mass mounted for movement about a Z axis within an X-Y plane and a proof mass mounted within the dither mass by a flexure for movement with respect to the dither mass, the steps of the method comprising:
applying driving signals to the dither mass to vibrate the dither mass and the proof mass at a combined resonant frequency about the Z axis; and
applying a restoring force to the proof mass which is in phase with the dithered displacement of the proof mass for nulling the quadrature without affecting the dither mass.

22. The method of claim 21 wherein the applying a restoring force step comprises:
applying a bias voltage to the proof mass;
applying plus and minus control voltages to electrodes adjacent to the proof mass; and
adjusting the control voltages to null the quadrature.

23. The method of claim 22 wherein the plus and minus d.c. control voltages are applied to top and bottom electrodes adjacent to the proof mass at fixed locations.

24. The method of claim 22 wherein said proof mass has a scalloped edge along a portion of the perimeter of the proof mass.

25. The method of claim 24 wherein the plus and minus control voltages are d.c. signals.

26. The method of claim 24 wherein the applying a restoring force step comprises:
applying a bias voltage to the proof mass;
applying plus and minus d.c. control voltages to electrodes adjacent to the scalloped edge of the proof mass; and
adjusting the d.c. voltages to null the quadrature.

27. The method of claim 26 wherein the d.c. control voltages are applied to electrodes which overlap one half of a scallop on the scalloped edge of the proof mass.

28. The method of claim 25 wherein the d.c. signals are applied to electrodes adjacent to each scallop on the proof mass.

29. The method of claim 26 wherein the plus and minus d.c. control voltages are applied to electrodes at both top and bottom sides of the proof mass adjacent to each scallop of the proof mass.

30. An apparatus for nulling the quadrature in an angular rate sensor, the apparatus comprising:

a dither mass mounted for motion about a Z axis in an X-Y plane;

a proof mass mounted within the dither mass by a flexure for movement with respect to the dither mass;

a source of bias voltage applied to the proof mass; and a source of d.c. control voltages applied to electrodes adjacent to an edge of the proof mass for providing a restoring force to the proof mass which is in phase with the dither displacement of the proof mass.

31. The apparatus of claim 30 wherein the source of d.c. control voltage comprises plus and minus d.c. voltages.

32. The apparatus of claim 31 wherein the proof mass has a scalloped edge at a portion of the perimeter of the proof mass.

33. The apparatus of claim 32 wherein the plus and minus d.c. control voltages are applied to electrodes adjacent to each scallop on the scalloped edge of the proof mass.

34. The apparatus of claim 33 wherein the plus and minus d.c. control voltages are applied to electrodes which overlap one half of a scallop on the scalloped edge of the proof mass when the proof mass is at rest.

35. An apparatus for nulling the quadrature in a coriolis angular rate sensor, comprising:

a dither mass flexurally mounted within a frame for vibrating about a Z axis in an X-Y plane;

a proof mass mounted within said dither mass by a flexure for movement with respect to the dither mass;

a source of bias voltage applied to the proof mass; and a source of d.c. control voltages applied to electrodes adjacent to the proof mass for providing a restoring force to the oscillating proof mass which is in phase with the displacement of the proof mass.

36. The apparatus of claim 35 wherein the source of d.c. control voltages comprise plus and minus d.c. voltages.

37. The apparatus of claim 36 wherein the proof mass has a scalloped edge around a portion of the perimeter of the proof mass.

38. The apparatus of claim 37 wherein the plus and minus d.c. voltages are applied to electrodes which overlap one half of a scallop on the scalloped edge of the proof mass.

39. The apparatus of claim 37 wherein the plus and minus d.c. control voltages are applied to electrodes adjacent to each scallop on the proof mass.

* * * * *